United States Patent
Ishikawa et al.

(10) Patent No.: US 11,407,621 B2
(45) Date of Patent: Aug. 9, 2022

(54) CRANE

(71) Applicant: TADANO LTD., Kagawa (JP)

(72) Inventors: Iwao Ishikawa, Kagawa (JP); Keisuke Tamaki, Kagawa (JP)

(73) Assignee: TADANO LTD., Kagawa (JP)

( * ) Notice: Subject to any disclaimer, the term of this patent is extended or adjusted under 35 U.S.C. 154(b) by 273 days.

(21) Appl. No.: 16/464,144

(22) PCT Filed: Dec. 8, 2017

(86) PCT No.: PCT/JP2017/044235
§ 371 (c)(1),
(2) Date: May 24, 2019

(87) PCT Pub. No.: WO2018/105742
PCT Pub. Date: Jun. 14, 2018

(65) Prior Publication Data
US 2020/0307967 A1 Oct. 1, 2020

(30) Foreign Application Priority Data

Dec. 9, 2016 (JP) .............................. JP2016-239909

(51) Int. Cl.
*B66C 13/12* (2006.01)
*B66C 13/48* (2006.01)
(Continued)

(52) U.S. Cl.
CPC .............. *B66C 13/48* (2013.01); *B60R 1/002* (2013.01); *H04N 13/128* (2018.05)

(58) Field of Classification Search
CPC ....... B66C 13/00; B66C 23/905; B66C 13/46; B66C 15/00; B66C 13/48; B66C 23/88;
(Continued)

(56) References Cited

U.S. PATENT DOCUMENTS

2009/0326734 A1  12/2009  Gudat
2011/0310095 A1*  12/2011  Tung .................... G06T 15/503
  345/419
(Continued)

FOREIGN PATENT DOCUMENTS

JP  H08-053290 A  2/1996
JP  2007-225342 A  9/2007
(Continued)

OTHER PUBLICATIONS

Jul. 23, 2020, European Search Report issued for related EP application No. 17877886.6.
(Continued)

*Primary Examiner* — Masum Billah
(74) *Attorney, Agent, or Firm* — Paratus Law Group, PLLC

(57) ABSTRACT

A crane creates a 3D map on the basis of three-dimensional information acquired by a three-dimensional information obtaining section that is provided on a boom. The three-dimensional information obtaining section: is configured to be capable of accumulating acquired three-dimensional information and to be capable of changing a measurement direction, a measurement range, and a measurement density; and creates the 3D map by superimposing accumulated three-dimensional information. When an operation signal for a swivel operation for a swivel base, a hoisting operation for the boom, or an extension/retraction operation for the boom has been detected, on the basis of the movement direction and movement speed of the boom as calculated from a detected value for the operation signal, the three-dimensional information obtaining section: changes the measurement direction; and narrows the measurement range and increases the measurement density as compared to when the operation signal has not been detected.

6 Claims, 7 Drawing Sheets

(51) Int. Cl.
*H04N 13/128* (2018.01)
*B60R 1/00* (2022.01)

(58) Field of Classification Search
CPC ... B66C 23/705; B66C 23/701; B66C 23/708; B66C 23/707; B66C 23/702; B66C 23/62; B66C 23/42; B66C 23/82; B66C 13/18; B66C 13/16; B66C 23/66; B66C 23/342; B66C 23/36; B66C 23/54; B66C 23/703; G06F 17/10; G06F 30/20
See application file for complete search history.

(56) References Cited

U.S. PATENT DOCUMENTS

| | | | |
|---|---|---|---|
| 2013/0013251 A1 | 1/2013 | Schoonmaker et al. | |
| 2014/0107971 A1 | 4/2014 | Engedal et al. | |
| 2015/0249821 A1* | 9/2015 | Tanizumi | B66C 13/00 348/46 |

FOREIGN PATENT DOCUMENTS

| | | |
|---|---|---|
| JP | 2009-198382 A | 9/2009 |
| JP | 3184777 U | 7/2013 |
| JP | 2016-175766 A | 10/2016 |
| JP | WO2015/198410 A1 | 4/2017 |
| WO | WO 2013/006625 A3 | 1/2013 |
| WO | WO 2014/046213 A1 | 3/2014 |
| WO | WO 2015/154508 A1 | 10/2015 |

OTHER PUBLICATIONS

Mar. 6, 2018, International Search Report issued for related PCT Application No. PCT/JP2017/044235.
Mar. 6, 2018, International Search Opinion issued for related PCT Application No. PCT/JP2017/044235.
Nov. 12, 2021, European Communication issued for related EP Application No. 17877886.6.

* cited by examiner (a)

(b)

(c)

(a)

(b)

(c)

CRANE

CROSS REFERENCE TO PRIOR APPLICATION

This application is a National Stage Patent Application of PCT International Patent Application No. PCT/JP2017/044235 (filed on Dec. 8, 2017) under 35 U.S.C. § 371, which claims priority to Japanese Patent Application No. 2016-239909 (filed on Dec. 9, 2016), which are all hereby incorporated by reference in their entirety.

TECHNICAL FIELD

The present invention relates to a crane.

BACKGROUND ART

A crane disclosed in PTL 1 is provided with a load monitoring camera at the distal end of a boom. An operator can operate the crane while monitoring a video from the load monitoring camera, thereby allowing a load to be safely raised and lowered even at a place where the load cannot be directly visually identified.

CITATION LIST

Patent Literature

PTL 1
Japanese Patent Application Laid-Open No. H08-53290

SUMMARY OF INVENTION

Technical Problem

By providing a three-dimensional information obtaining section, such as a laser scanner, at the distal end of the boom, a 3D map of an operation area can be created using three-dimensional information measured by the laser scanner. Unfortunately, during creation of the 3D map, certain setting of a measurement range and a measurement density of the laser scanner delays the 3D map creation. Accordingly, the operator who is working while viewing the 3D map cannot grasp the current situations, which sometimes makes the operation difficult.

An object of the crane of the present invention is to provide a crane that can create a 3D map in real time.

Solution to Problem

A crane of the present invention is a crane that creates a 3D map based on three-dimensional information obtained by a three-dimensional information obtaining section provided at a boom, in which the three-dimensional information obtaining section is configured to be capable of accumulating the obtained three-dimensional information and changing a measurement direction, a measurement range and a measurement density, and the 3D map is created by superposition on already accumulated three-dimensional information.

When an operation signal of a swing operation of a swivel base, a luffing operation of the boom or an extending and retracting operation of the boom is detected, the measurement direction is changed based on a movement direction and a movement rate of the boom calculated from a detected value of the operation signal, and the measurement range is reduced in comparison with the range in a case where the operation signal is not detected, and increases the measurement density.

The crane according to claim 2, wherein, when an operation amount of the swing operation, the luffing operation or the extending and retracting operation is changed, the measurement direction is corrected based on the operation amount.

When a delay in creation of the 3D map occurs, the amount of obtained three-dimensional information per hour is reduced by changing at least one of the measurement range and the measurement density of the three-dimensional information obtaining section.

Advantageous Effects of Invention

The present invention can create a 3D map in real time, thereby allowing the operation of the crane to be safely performed.

DESCRIPTION OF EMBODIMENTS

Hereinafter, referring to FIGS. 1 and 2, the entire configuration of crane 1 according to one embodiment of the present invention is described. Crane 1 is a movable crane that can move to an unspecified place. Crane 1 includes vehicle 2 and crane apparatus 6.

Figure 1:
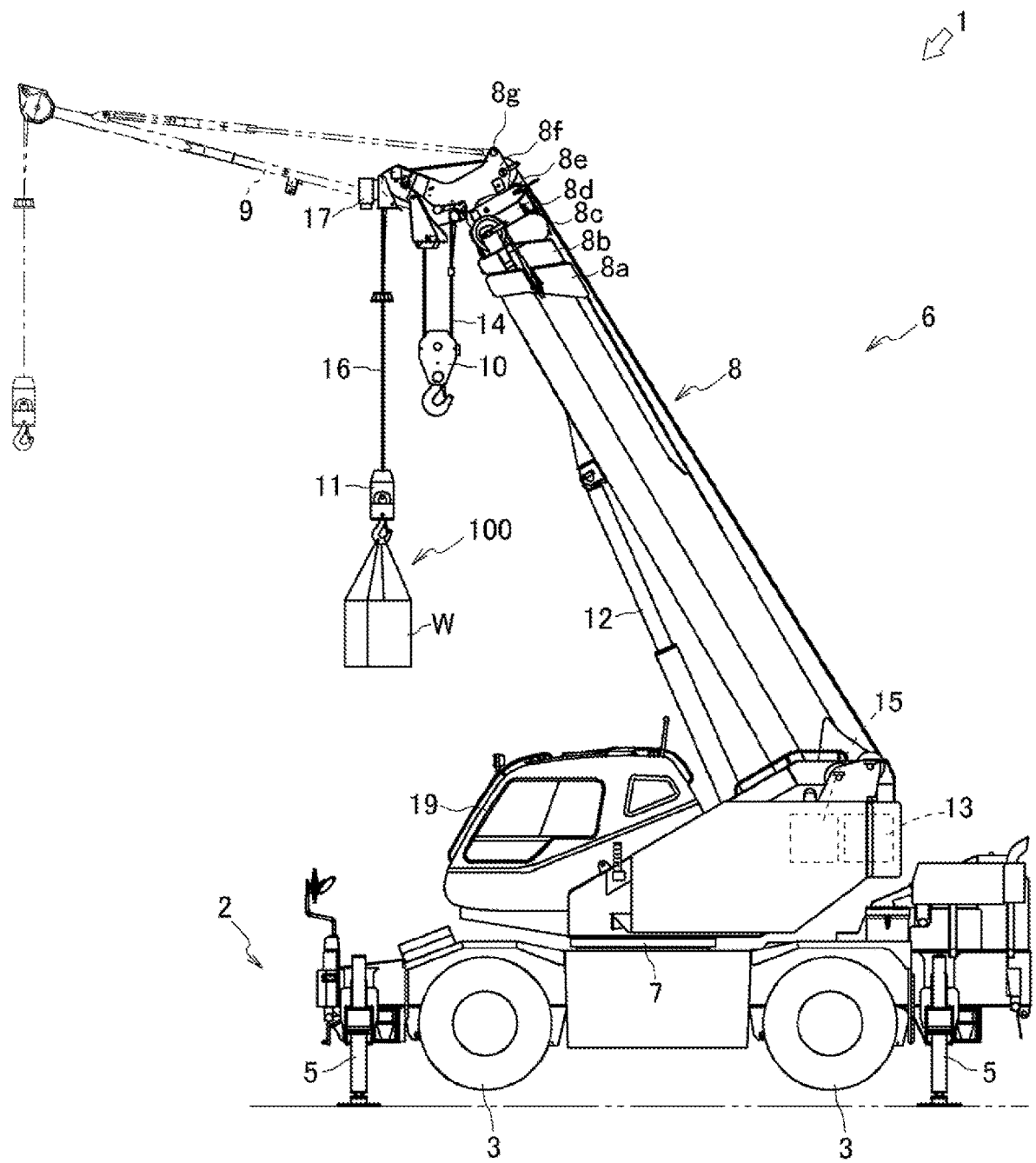
FIG. 1 is a side view illustrating the entire configuration of a crane according to one embodiment of the present invention.

As illustrated in FIG. 1, vehicle 2 conveys crane apparatus 6. Vehicle 2 includes multiple wheels 3, and travels with an engine (not illustrated) as a power source. Vehicle 2 is provided with outriggers 5. Outriggers 5 include extending beams that can extend in both the width directions of vehicle 2 by hydraulic pressure, and jack cylinders that can extend in the direction perpendicular to the ground. Vehicle 2 extends outriggers 5 in the width directions of vehicle 2 while bringing the jack cylinders into contact with the ground, thereby allowing crane 1 to perform an operation of conveying conveyance object W. Vehicle 2 is provided with GNSS apparatus 20 (see FIG. 2).

Crane apparatus 6 hooks conveyance object W and raises the object with a wire rope. Crane apparatus 6 includes swivel base 7, extending and retracting boom 8, jib 9, main hook block 10, sub-hook block 11, luffing cylinder 12, main winch 13, main wire rope 14, sub-winch 15, sub-wire rope 16, laser scanner 17, cabin 19, control apparatus 39 (see FIG. 2), and the like.

Swivel base 7 allows crane apparatus 6 to have a swingable configuration. Swivel base 7 is provided on a frame of vehicle 2 via a ring-shaped bearing. The ring-shaped bearing is disposed to have a rotation center perpendicular to the installation surface of vehicle 2. Swivel base 7 is configured to be rotatable in one direction and the other direction centered at the center of the ring-shaped bearing. Swivel base 7 is configured to be rotated by a hydraulic swing motor. Swivel base 7 is provided with swing position detection sensor 40 (see FIG. 2) that detects the swing position.

Telescopic boom 8 holds the wire rope in a state capable of hoisting conveyance object W. Telescopic boom 8 includes multiple boom members that are base boom member 8a, second boom member 8b, third boom member 8c, fourth boom member 8d, fifth boom member 8e, and top boom member 8f. The beam members are inserted in a telescopic manner in order of the size of sectional surfaces. Telescopic boom 8 is configured to be extensible and retractable in the axial direction by moving each boom member by an extending and retracting cylinder, which is not illustrated. Telescopic boom 8 is provided so that the proximal end of base boom member 8a can be swung on swivel base 7. Telescopic boom 8 is thus configured to be horizontally rotatable and swingable on the frame of vehicle 2. Telescopic boom 8 is provided with telescopic boom length detection sensor 41 (see FIG. 2) that detects the boom length, and luffing angle detection sensor 42 (see FIG. 2) that detects the luffing angle.

As illustrated in FIG. 1, jib 9 extends the lifting range and the operation radius of crane apparatus 6. The proximal end of jib 9 is configured to be connectable to jib support section 8g of top boom member 8f by driving a pin, which is not illustrated. Jib 9 is held in a position of protruding in a direction of extending the lifting range and the operation radius, from the distal end of top boom member 8f.

Main hook block 10 is for hoisting conveyance object W. Main hook block 10 is provided with multiple hook sheaves around which main wire rope 14 is wound, and a main hook that hoists conveyance object W. Sub-hook block 11 is for hoisting conveyance object W. Sub-hook block 11 is provided with a sub-hook that hoists conveyance object W.

Luffing cylinder 12 raises and lowers telescopic boom 8, and holds the position of telescopic boom 8. Luffing cylinder 12 includes a hydraulic cylinder made up of a cylinder section and a rod section. In luffing cylinder 12, an end of the cylinder section is swingably coupled to swivel base 7, and an end of the rod section is swingably coupled to base boom member 8a of telescopic boom 8. Luffing cylinder 12 is configured to raise base boom member 8a by supplying hydraulic oil so as to push the rod section out of the cylinder section, and is configured to lower base boom member 8a by supplying the hydraulic oil so as to pull the rod section back into cylinder section. Luffing cylinder 12 is provided with moment detection sensor 12a (see FIG. 2) that detects the moment applied to telescopic boom 8 by detecting the pressure in the cylinder.

Main winch 13, which is a hydraulic winch, winds up (reeling up) and feeds out (releasing) main wire rope 14. Main wire rope 14 is provided with tension detector 14a (see FIG. 2) that detects the value of the tension. Sub-winch 15, which is a hydraulic winch, winds up (reels up) and feeds out (releases) sub-wire rope 16. Sub-wire rope 16 is provided with tension detector 16a (see FIG. 2) that detects the value of the tension.

Laser scanner 17 is provided as a three-dimensional information obtaining section, and obtains three-dimensional information by calculating a measured distance from a time period in which laser light is reflected by an object and travels back. Laser scanner 17 is provided at the distal end of top boom member 8f of telescopic boom 8, or the distal end of jib 9 (in this embodiment, the distal end of top boom member 8f). Laser scanner 17 is configured to be swingable, via an actuator, centered on an axis, as a swing center, parallel to the swing axis of telescopic boom 8. Laser scanner 17 is configured to be capable of measuring an area perpendicularly downward from the installation position irrespective of the lowered angle of telescopic boom 8 or the lowered angle of jib 9, and is configured to be capable of changing its position from that perpendicularly downward in any situation. Laser scanner 17 is connected to control apparatus 39, and allows measured three-dimensional information to be transmitted to control apparatus 39.

Cabin 19 covers an operator compartment. Cabin 19 is provided at the side of telescopic boom 8, on swivel base 7. The operator compartment is provided in cabin 19. In the operator compartment, a main operation tool for operating main winch 13, a sub-operation tool for operating sub-winch 15, a luffing operation tool for operating telescopic boom 8, a steering for moving crane 1, monitor 22 (see FIG. 2), and the like are provided.

GNSS apparatus 20 is provided as a satellite positioning system, and receives positioning signals broadcast by positioning satellites and measures (calculates) the position coordinates of crane 1. GNSS apparatus 20 is provided on a body frame of vehicle 2. The positioning satellites mean GNSS satellites, which include GPS satellites. GNSS apparatus 20 receives signals from multiple satellites, thereby outputting the current position of crane 1 as coordinate data made up of the latitude, longitude and altitude. GNSS apparatus 20 is connected to control apparatus 39, thereby allowing the position coordinates of crane 1 to be transmitted.

Crane 1 having such a configuration can move crane apparatus 6 to any position by causing vehicle 2 to travel. Crane 1 can extend the lifting range and the operation radius of crane apparatus 6 by raising telescopic boom 8 to any luffing angle by luffing cylinder 12, extending telescopic boom 8 to any boom length, and coupling jib 9.

Figure 2:
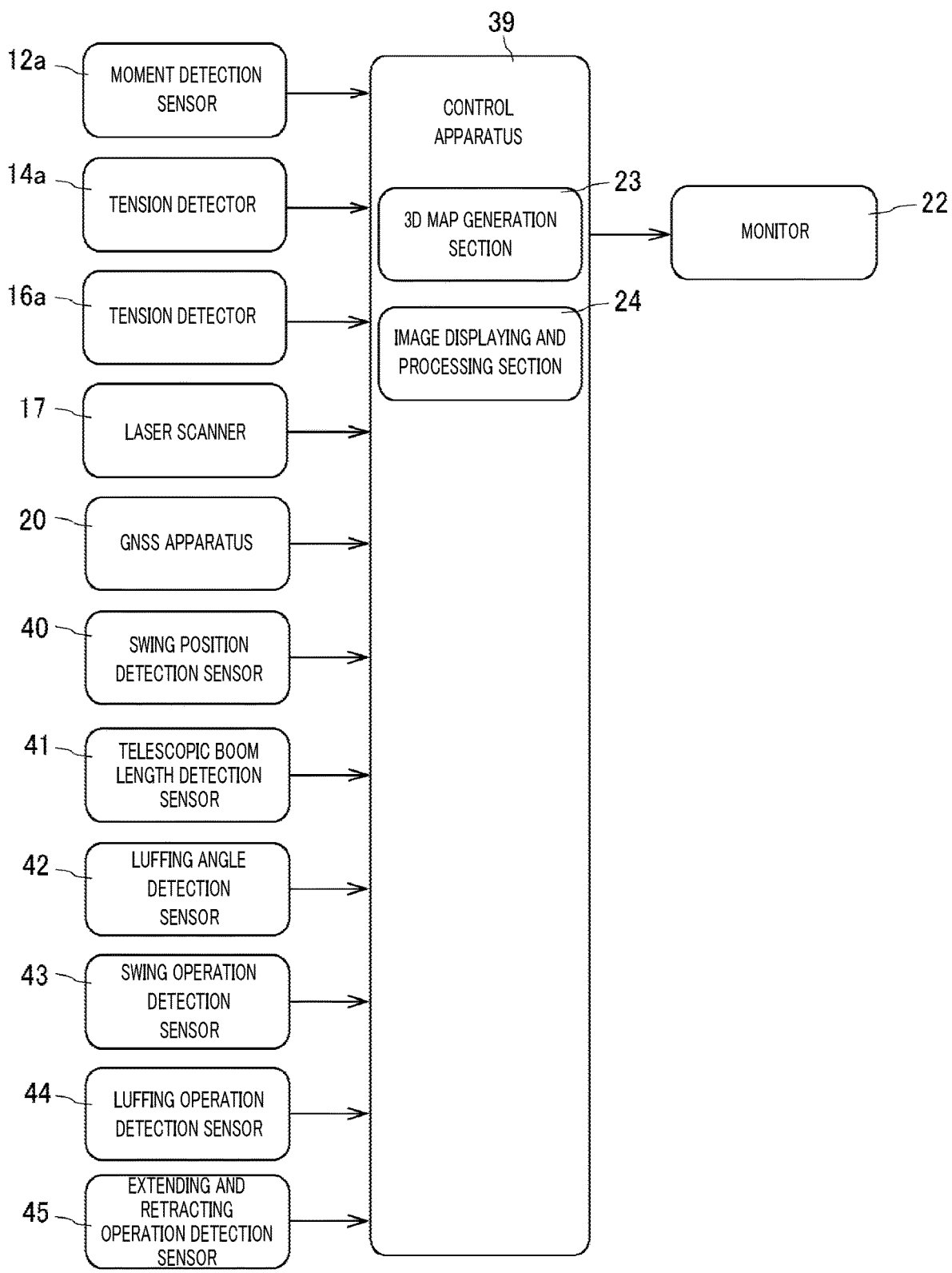
FIG. 2 illustrates a control block configuration of the crane according to one embodiment of the present invention.

As illustrated in FIG. 2, control apparatus 39 includes 3D map generation section 23 that creates a 3D map on the basis of three-dimensional information obtained by laser scanner 17, and image displaying and processing section 24.

3D map generation section 23 obtains three-dimensional information (point group data) measured by laser scanner 17 in operation area A (see FIG. 4) of crane 1, and creates a 3D map. Specifically, 3D map generation section 23 obtains three-dimensional information that is represented in a laser scanner coordinate system and is measured by laser scanner 17. Next, 3D map generation section 23 transforms the three-dimensional information represented in the laser scanner coordinate system into three-dimensional information represented in a predetermined reference coordinate system (for example, a global coordinate system). After laser scanner 17 has obtained the three-dimensional information, 3D map generation section 23 generates a 3D map on the basis of the obtained three-dimensional information. The three-dimensional information described here indicates point group data represented as three-dimensional coordinate values of an object to be measured by laser scanner 17. The point group data is configured to include color information.

3D map generation section 23 may be configured to be capable of discriminating point group data that constitutes crane 1 from point group data represented in the predetermined reference coordinate system obtained using laser scanner 17, by object recognition, and to exclude the point group data constituting crane 1 from the point group data obtained by using laser scanner 17. A method of the object recognition of crane 1 may be appearance-based object recognition or model-based object recognition.

In the above configuration, laser scanner 17, which calculates the measured distance from the time period in which the beam is reflected by an object and travels back, is adopted as the three-dimensional information obtaining section. However, without limitation thereto, this section may be, for example, such as a laser scanner that calculates the measured distance from the phase difference between laser beams having different wavelengths, or a stereo camera that obtains distance information using the parallax.

Image displaying and processing section 24 generates a 3D model of crane 1 from the current position of crane 1, and projects the model on the 3D map created by 3D map generation section 23. The 3D model of crane 1 is generated on the basis of the current position of crane 1 calculated from values detected by swing position detection sensor 40, telescopic boom length detection sensor 41, luffing angle detection sensor 42, and moment detection sensor 12a. The 3D model of crane 1 is projected on the 3D map on the basis of the current position of crane 1 detected using GNSS apparatus 20.

Image displaying and processing section 24 can transform the point group data obtained by laser scanner 17 into data that represents the 3D structure of the surface of the object, and generate the 3D map. Alternatively, image displaying and processing section 24 may generate the 3D map by pasting image data on the point group data represented in the predetermined reference coordinate system obtained by using laser scanner 17, the image data being taken by an imaging section that is a separately provided camera or is a camera included in laser scanner 17, and then being divided for individual display areas.

As an output portion, monitor is connected to control apparatus 39. Monitor 22 can display, in real time, an image taken by the imaging section, such as the separately provided camera or the camera included in laser scanner 17, and display the 3D map created on the basis of the three-dimensional information obtained by laser scanner 17, from any viewpoint.

According to the above configuration, the three-dimensional information obtained by laser scanner 17 is processed by 3D map generation section 23 and image displaying and processing section 24, thereby allowing the 3D map to be displayed on monitor 22. Accordingly, for example, even for a site (blind area) that is invisible from the operator compartment of crane 1, the 3D map from a desired viewpoint can be displayed on monitor 22, and the operator can safely perform the operation of hoisting conveyance object W and the like while checking the blind area on monitor 22.

Control apparatus 39 is connected to tension detector 14a, and is configured to be capable of calculating the weight (including the weight of a hook and the like) of conveyance object W hoisted by main wire rope 14, from the tension of main wire rope 14 detected by tension detector 14a. Control apparatus 39 is configured to be capable of calculating the weight (including the weight of a hook and the like) of conveyance object W hoisted by sub-wire rope 16, from the tension of sub-wire rope 16 detected by tension detector 16a.

Control apparatus 39 is connected to moment detection sensor 12a, and can obtain the moment related to telescopic boom 8. Control apparatus 39 is connected to swing position detection sensor 40 of swivel base 7, and can obtain the swing direction and the swing angle of swivel base 7 detected by swing position detection sensor 40. Control apparatus 39 is connected to telescopic boom length detection sensor 41 of telescopic boom 8 and luffing angle detection sensor 42, and can obtain the boom length of telescopic boom 8 detected by telescopic boom length detection sensor 41 and the luffing angle of telescopic boom 8 detected by luffing angle detection sensor 42.

Control apparatus 39 can calculate the current position of crane 1 in consideration of the deflection of telescopic boom 8 on the basis of the values detected by swing position detection sensor 40, telescopic boom length detection sensor 41, luffing angle detection sensor 42 and moment detection sensor 12a. Control apparatus 39 may calculate the weight of conveyance object W on the basis of swing position detection sensor 40, telescopic boom length detection sensor 41, luffing angle detection sensor 42 and moment detection sensor 12a.

Control apparatus 39 is connected to swing operation detection sensor 43 that swings swivel base 7, and can obtain the input direction and input angle of a swing operation tool. Control apparatus 39 is connected to luffing operation detection sensor 44 of telescopic boom 8, and can obtain the input direction and input angle of a luffing operation tool. Control apparatus 39 is connected to extending and retracting operation detection sensor 45 of telescopic boom 8, and can obtain the input direction and input angle of an extending and retracting operation tool.

Figure 3:
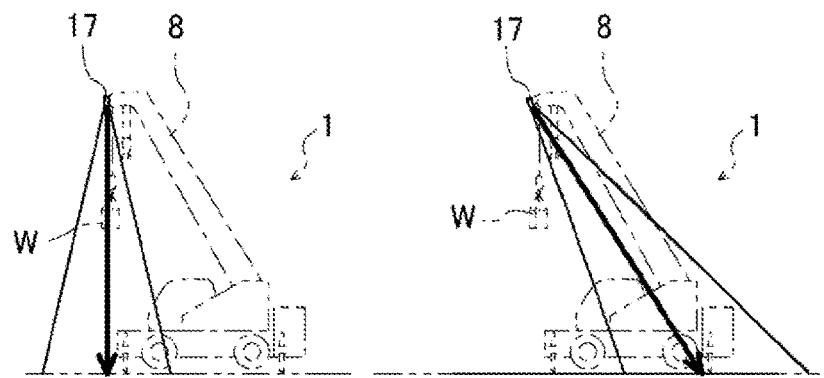
FIG. 3A is schematic side views illustrating the measurement direction of a laser scanner in the crane according to one embodiment of the present invention.
FIG. 3B is schematic side views illustrating the measurement range of the laser scanner in the crane according to one embodiment of the present invention.
FIG. 3C is schematic side views illustrating the measurement density of the laser scanner in the crane according to one embodiment of the present invention.
Figure 3:
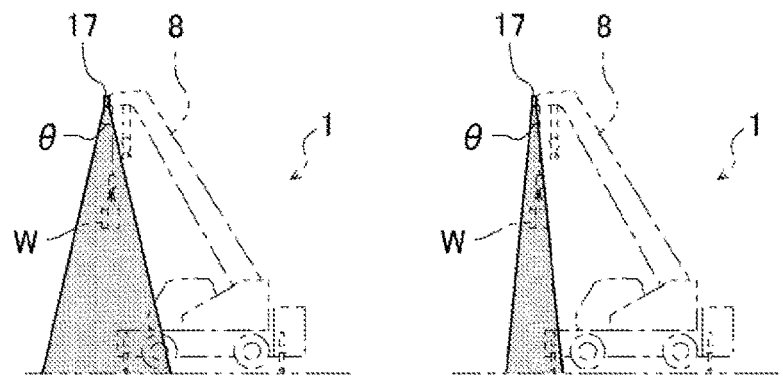
Figure 3:
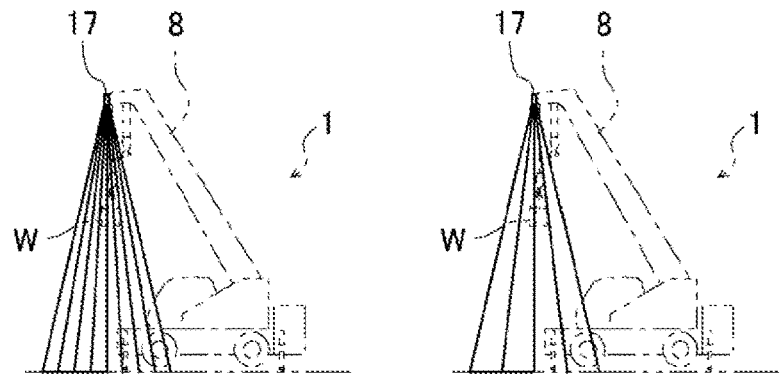
Figure 4:
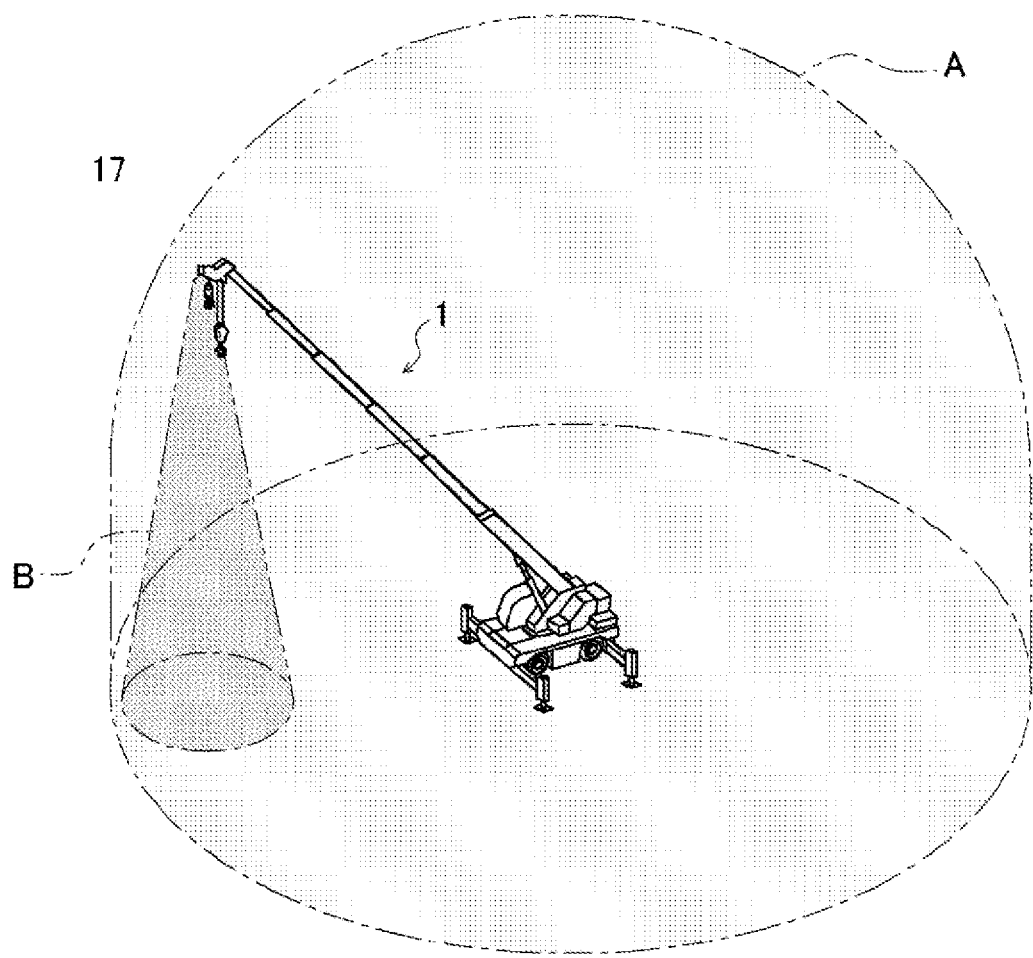
FIG. 4 illustrates an area of a 3D map generated by the crane according to one embodiment of the present invention, and an area measured by the laser scanner.

As illustrated in FIGS. 3A, 3B and 3C, laser scanner 17 can change the measurement direction, the measurement range and the measurement density. As illustrated in FIG. 3A, the measurement direction can be changed by an actuator swinging laser scanner 17. As illustrated in FIG. 3B, the measurement range can be changed by adjusting the scan angle θ set centered in the measurement direction of laser scanner 17. As illustrated in FIG. 3C, the measurement density can be changed by adjusting the number of laser light beams of laser scanner 17 emitted into a freely defined range. As illustrated in FIG. 4, crane 1 at an operation site is configured to be capable of obtaining three-dimensional information on monitoring area B made up of the measurement direction and the measurement range of laser scanner 17 in operation area A. The operator sequentially obtains the three-dimensional information on monitoring area B that is changed according to the swing operation of swivel base 7, the luffing operation of telescopic boom 8, the extending and retracting operation of telescopic boom 8, or the traveling operation of crane 1, thereby obtaining the three-dimensional information on the entire range of operation area A. Laser scanner 17 is set so as to have a wide measurement range and a low measurement density during obtaining the three-dimensional information, and is configured to be capable of quickly obtaining sparse three-dimensional information (setting in a normal case).

Crane 1 sequentially accumulates the three-dimensional information measured by laser scanner 17, in control apparatus 39. The newly obtained three-dimensional information is then superposed on the already obtained three-dimensional information to create the 3D map. Accordingly, even if sparse three-dimensional information is obtained in operation area A, dense three-dimensional information can be increasingly obtained by superposing the newly obtained three-dimensional information. The 3D map creation includes not only new creation of a 3D map but also update of an existing 3D map.

As described above, the 3D map is created by superposing the newly obtained three-dimensional information on the already accumulated three-dimensional information, thereby allowing the 3D map based on the dense three-dimensional information to be created. Accordingly, the operator can perform the operation through crane 1 while viewing the 3D map that accurately indicates the surrounding situations. The three-dimensional information on the entire range of operation area A can be quickly obtained by obtaining the three-dimensional information with preliminary setting where laser scanner 17 has a wide measurement range and a low measurement density. Consequently, the 3D map can be created without spending a long time prior to the operation with crane 1.

Control apparatus 39 compares the three-dimensional information newly obtained by laser scanner 17 with the already accumulated three-dimensional information, thereby determining whether an unmeasurable site exists due to buildings or the ground surface being behind an obstacle or the like. If there is any unmeasurable site, control apparatus 39 complements the newly obtained three-dimensional information with the already obtained three-dimensional information, and creates the 3D map.

Control apparatus 39 determines whether the three-dimensional information newly obtained by laser scanner 17 has a blank area or not. The blank area indicates an area such as a puddle or glass, which is difficult to reflect laser light. If there is any blank area, control apparatus 39 complements the newly obtained three-dimensional information with the already obtained three-dimensional information or adjacent three-dimensional information, and creates the 3D map.

Control apparatus 39 determines whether a delay in 3D map creation occurs or not. Control apparatus 39 is configured to reduce the amount of obtained three-dimensional information per hour by changing at least one of the measurement range or the measurement density of laser scanner 17, when it is determined that the delay occurs.

Laser scanner 17 is configured to reduce the measurement range and the measurement density when the delay in 3D map creation occurs. In this case, the measurement range is limited to an adjacent range with reference to the own vehicle, and the measurement density is set to be low. The limitation of the measurement range as described above can reduce the amount of three-dimensional information per hour obtained by laser scanner 17. The limitation of the measurement range to the adjacent range reference to the own vehicle allows the situations around crane 1 to be grasped, thereby enabling a safe crane operation to be achieved. Setting the measurement density low can reduce the amount of three-dimensional information per hour obtained by laser scanner 17. As described above, the reduction in the amount of three-dimensional information per hour obtained by laser scanner 17 can, in turn, reduce the delay in 3D map creation. The delay in 3D map creation may be determined based on a time required from start of measurement by laser scanner 17 in monitoring area B to the reflection of the measurement on the 3D map, or based on the load or the like related to control apparatus 39.

As described above, if the delay in 3D map creation occurs, the delay in measurement can be removed by changing at least one of the measurement range or the measurement density, thereby allowing the 3D map to be created in real time. Accordingly, a safe crane operation can be achieved while the 3D map displayed on monitor 22 is viewed.

When the operation signal of the swing operation of swivel base 7, the luffing operation of telescopic boom 8, or the extending and retracting operation of telescopic boom 8 is detected, control apparatus 39 changes the measurement direction of laser scanner 17 on the basis of the movement direction and the movement rate of telescopic boom 8 calculated from the detected value of the operation signal. The measurement direction is changed to indicate the movement destination of a projection position where the distal end of telescopic boom 8 is projected perpendicularly downward. In this case, the measurement direction is set to indicate a predetermined position at the movement destination of the projection position of the distal end of telescopic boom 8 so as to be capable of sequentially obtaining the three-dimensional information on the movement destination, according to the movement of telescopic boom 8, and creating the 3D map without delay. Control apparatus 39 then changes the measurement range to be narrow and the measurement density to be high in comparison with those in a case where the operation signal is not detected.

The operation signal of the swing operation of swivel base 7 indicates a signal detected by swing operation detection sensor 43. The operation signal of the luffing operation of telescopic boom 8 indicates a signal detected by luffing operation detection sensor 44. The operation signal of the extending and retracting operation of telescopic boom 8 indicates a signal detected by extending and retracting operation detection sensor 45.

Figure 5:
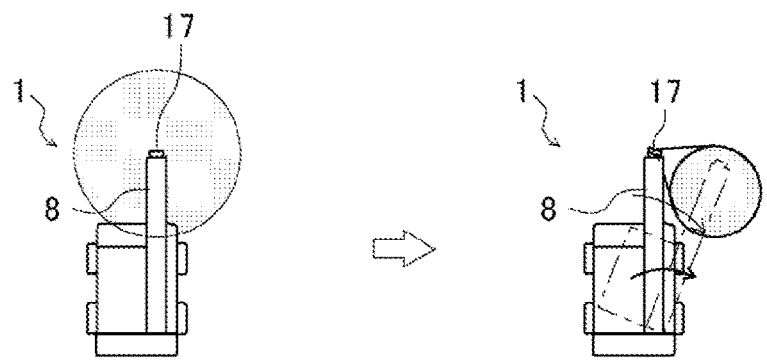
FIG. 5A is schematic plan views illustrating the measurement direction and the measurement range of the laser scanner during swing motion of the crane according to one embodiment of the present invention.
FIG. 5B is schematic side views illustrating the measurement direction and the measurement range of the laser scanner during luffing motion of the crane according to one embodiment of the present invention.
FIG. 5C is schematic side views illustrating the measurement direction and the measurement range of the laser scanner according to one embodiment of the present invention.
Figure 5:
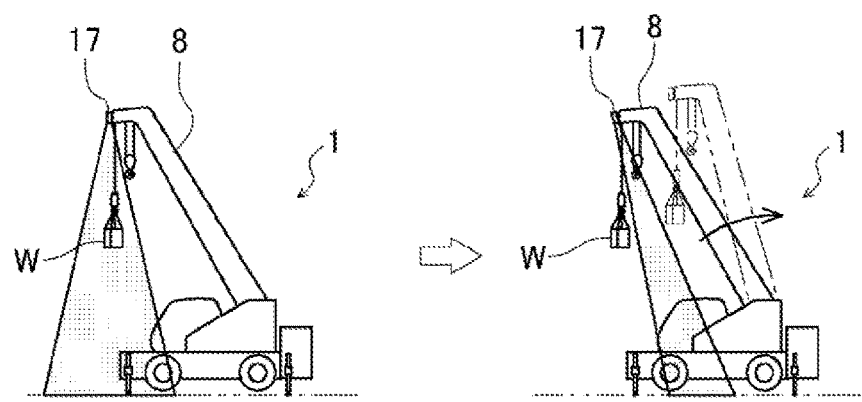
Figure 5:
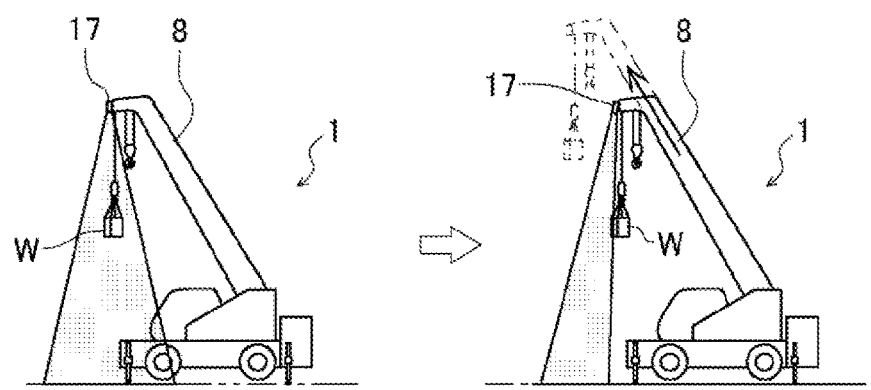

As illustrated in FIG. 5A, when the operation signal of the swing operation of swivel base 7 is detected, the measurement direction is changed to the swing destination (a predetermined position at the right swing destination in this embodiment) at the projection position of the distal end of telescopic boom 8 on the basis of the swing direction and the swing rate of telescopic boom 8 calculated from the detected value of the operation signal. The measurement range is set to be narrow centered on the measurement direction. The measurement density is set to allow the three-dimensional information to be densely obtained in the measurement range.

As illustrated in FIG. 5B, when the operation signal of the luffing operation of telescopic boom 8 is detected, the measurement direction is changed to the luffing destination (a predetermined position at the uprising destination in this embodiment) at the projection position of the distal end of telescopic boom 8 on the basis of the luffing direction and the luffing rate of telescopic boom 8 calculated from the detected value of the operation signal. The measurement range is set to be narrow centered on the measurement direction. The measurement density is set to allow the three-dimensional information of high density to be obtained in the measurement range.

As illustrated in FIG. 5C, when the operation signal of the extending and retracting operation of extending and retracting boom 8 is detected, the measurement direction is changed to the extending and retracting destination (a predetermined position at the extending destination in this embodiment) at the projection position of the distal end of telescopic boom 8 on the basis of the extending and retracting direction and the extending and retracting rate of telescopic boom 8 calculated from the detected value of the operation signal. The measurement range is set to be narrow centered on the measurement direction. The measurement density is set to allow the three-dimensional information of high density to be obtained in the measurement range.

In the above configuration, change in the measurement direction of laser scanner 17 based on the movement direction and the movement rate of telescopic boom 8, can obtain the three-dimensional information at the site of the movement destination that the operator intends to look at, before the movement motion of telescopic boom 8. Change to a narrower measurement range and to a higher measurement density in comparison with those in a case where the operation signal is not detected, may limit the site of the movement destination that the operator intends to look at, and the three-dimensional information of high density may be obtained. Accordingly, the situations at the site that the operator is looking at can be grasped while the 3D map is created in real time.

When the operation signal of the swing operation of swivel base 7, the luffing operation of telescopic boom 8, or the extending and retracting operation of telescopic boom 8 is detected and a delay in 3D map creation occurs, control apparatus 39 changes at least one of the measurement range or the measurement density, thereby reducing the amount of three-dimensional information per hour obtained by laser scanner 17. In this embodiment, the measurement density is set to be low.

When the operation signal described above is detected and an operation amount is changed, control apparatus 39 corrects the measurement direction on the basis of the changed operation amount. The operation amount described here indicates the swing rate of swivel base 7, the luffing rate of telescopic boom 8, and the extending and retracting rate of telescopic boom 8. For example, when the swing rate increases during swinging of swivel base 7, the measurement direction of laser scanner 17 is corrected to indicate a position nearer to the swing destination. When the swing rate decreases during swinging of swivel base 7, the measurement direction of laser scanner 17 is corrected to indicate a position nearer to the swing originating point.

As described above, when the operation amount is changed, the measurement direction is changed based on the changed operation amount. In this way, even with change in the movement rate of telescopic boom 8, the measurement direction can be corrected on the basis of the movement rate to create the 3D map without delay by sequentially obtaining the three-dimensional information on the movement destination along with the movement of telescopic boom 8. When the operation signal described above is detected and the operation amount is changed, control apparatus 39 corrects only the measurement direction on the basis of the changed operation amount. However, the correction is not limited thereto. The configuration may allow the measurement range and the measurement density to be corrected.

When the operation signal described above is detected, control apparatus 39 corrects the measurement direction in consideration of the longitudinal deflection of telescopic boom 8. Occurrence of the longitudinal deflection of telescopic boom 8 changes the position of the distal end of telescopic boom 8 and the circumferential velocity of the distal end of telescopic boom 8. Accordingly, based on the movement direction and the movement rate of telescopic boom 8 in consideration of the longitudinal deflection, the measurement direction of laser scanner 17 can be set to indicate the actual movement destination of telescopic boom 8. The amount of the longitudinal deflection of telescopic boom 8 is calculated from the detected values of swing position detection sensor 40, telescopic boom length detection sensor 41, luffing angle detection sensor 42 and moment detection sensor 12a, and the weight of conveyance object W. Control apparatus 39 corrects only the measurement direction in consideration of the longitudinal deflection of telescopic boom 8. The correction is not limited thereto. The configuration may also be such that the measurement range and the measurement density are corrected. Control apparatus 39 may be configured to be capable of calculating the load fluctuation of conveyance object W, and widening the measurement range of laser scanner 17 irrespective of the detected value of the operation signal when the load fluctuation is larger than a predetermined value.

When the operation signal described above is detected, control apparatus 39 may correct the measurement direction in consideration of the lateral deflection of telescopic boom 8. For example, occurrence of the lateral deflection of telescopic boom 8 sometimes makes the distal end of telescopic boom 8 deviate in the swing direction. Accordingly, based on the movement direction of telescopic boom 8 in consideration of the lateral deflection, the measurement direction of laser scanner 17 is changed to the swing deviating destination of telescopic boom 8. The amount of lateral deflection of telescopic boom 8 is calculated from the detected values of swing position detection sensor 40, telescopic boom length detection sensor 41, luffing angle detection sensor 42 and moment detection sensor 12a, and the weight of conveyance object W. Control apparatus 39 corrects only the measurement direction in consideration of the lateral deflection of telescopic boom 8. The correction is not limited thereto. The configuration may also be such that the measurement range and the measurement density are corrected.

Figure 6:
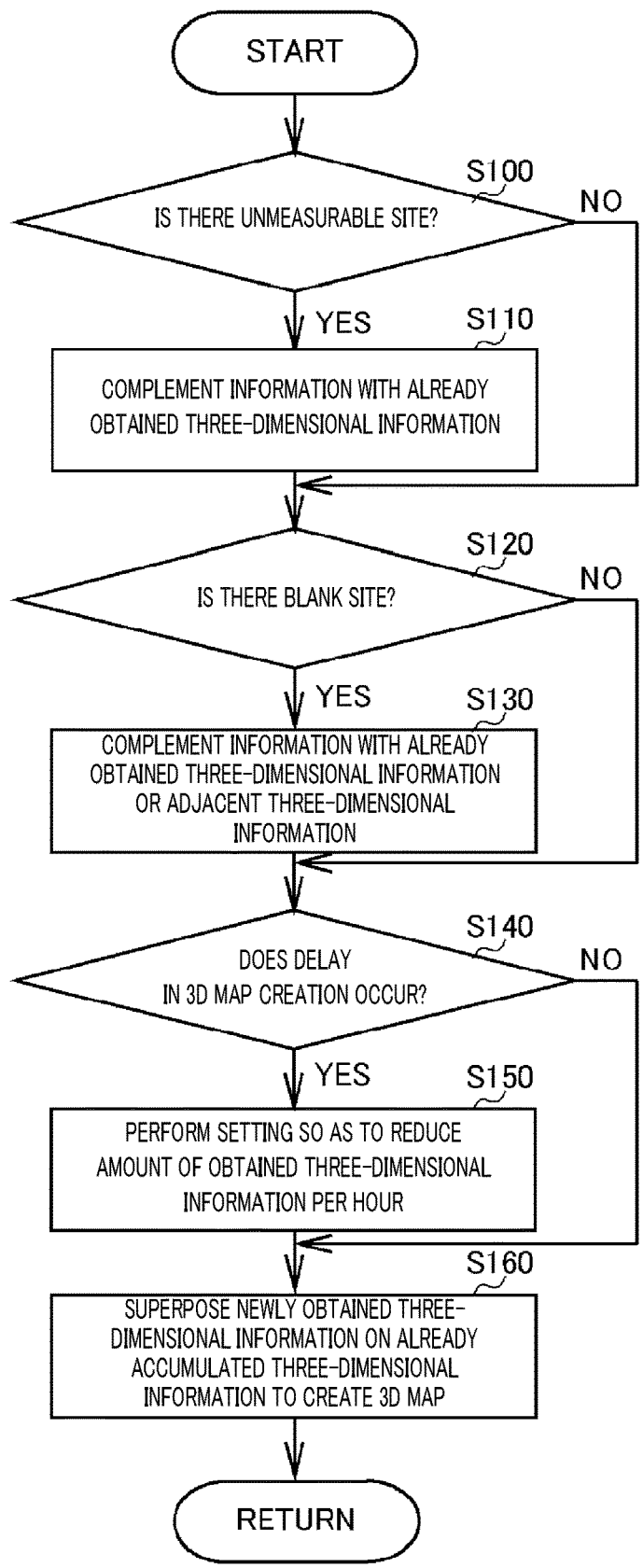
FIG. 6 is a flowchart illustrating 3D map creation control according to one embodiment of the present invention.

Hereinafter, referring to FIG. 6, 3D map creation control is described.

In step S100, upon obtainment of the three-dimensional information, control apparatus 39 compares the newly obtained three-dimensional information with the already obtained three-dimensional information, thereby determining whether an unmeasurable site exists due to buildings or the ground surface being behind an obstacle or the like. When control apparatus 39 determines that the unmeasurable site is present, the apparatus makes the processing transition to step S110. When control apparatus 39 determines that the unmeasurable site is not present, the apparatus makes the processing transition to step S120.

In step S110, control apparatus 39 complements the newly obtained three-dimensional information with the already obtained three-dimensional information, and makes the processing transition to step S120.

In step S120, control apparatus 39 determines whether the newly obtained three-dimensional information has a blank area or not. When control apparatus 39 determines that the blank area is present, the apparatus makes the processing transition to step S130. When control apparatus 39 determines that the blank area is not present, the apparatus makes the processing transition to step S140.

In step S130, control apparatus 39 complements the newly obtained three-dimensional information with the already obtained three-dimensional information or adjacent three-dimensional information, and makes the processing transition to step S140.

In step S140, control apparatus 39 determines whether a delay in 3D map creation occurs or not. When control apparatus 39 determines that the delay occurs, the apparatus makes the processing transition to step S150. When control apparatus 39 determines that the delay does not occur, the apparatus makes the processing transition to step S160.

In step S150, control apparatus 39 changes at least one of the measurement range and the measurement density of laser scanner 17 so as to reduce the amount of three-dimensional information per hour obtained by laser scanner 17, and makes the processing transition to step S160.

In step 160, control apparatus 39 superposes the newly obtained three-dimensional information on the already obtained three-dimensional information to create the 3D map, and the processing returns.

Figure 7:
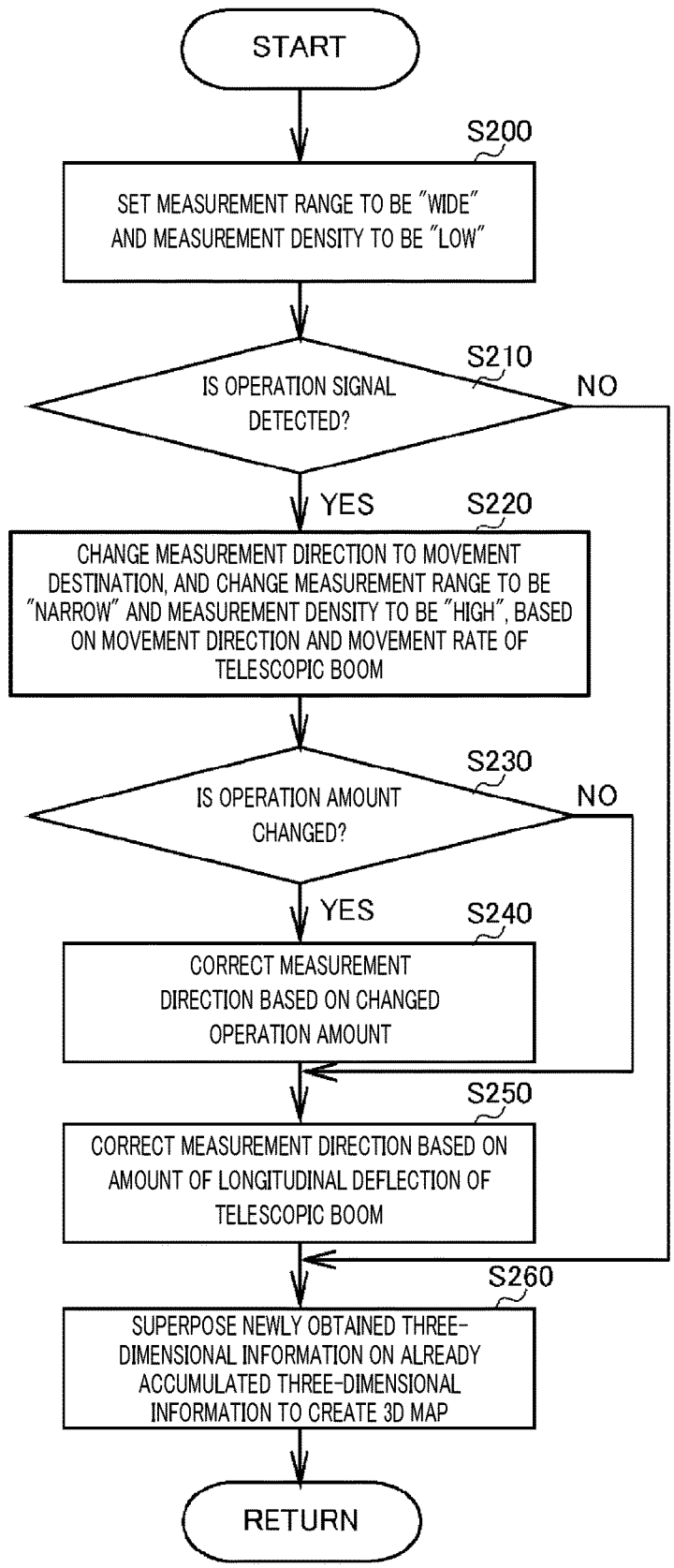
FIG. 7 is a flowchart illustrating control of the laser scanner during 3D map creation according to one embodiment of the present invention.

Hereinafter, referring to FIG. 7, control of laser scanner 17 during 3D map creation is described.

In step S200, control apparatus 39 sets the measurement range of laser scanner 17 to be wide and the measurement density to be low, and makes the processing transition to step S210.

In step S210, control apparatus 39 determines whether the operation signal of crane 1 is detected or not. If control apparatus 39 determines that the operation signal is detected, this apparatus causes the processing to transition to step S220. When control apparatus 39 determines that the operation signal is not detected, the apparatus makes the processing transition to step S260.

In step S220, control apparatus 39 changes the measurement direction of laser scanner 17 and changes the measurement range to be narrow and the measurement density to be high in comparison with those in a case where the operation signal is not detected, based on the movement direction and the movement rate of telescopic boom 8 calculated from the detected values of the operation signal, and makes the processing transition to step S230.

In step S230, control apparatus 39 determines whether the operation amount is changed or not. When control apparatus 39 determines that the operation amount is changed, the apparatus makes the processing transition to step S240. When control apparatus 39 determines that the operation amount is not changed, the apparatus makes the processing transition to step S250.

In step S240, control apparatus 39 corrects the measurement direction of laser scanner 17 on the basis of the changed operation amount, and makes the processing transition to step S250.

In step S250, control apparatus 39 corrects the measurement direction of laser scanner 17 on the basis of the amount of longitudinal deflection of telescopic boom 8, and makes the processing transition to step S260.

In step 260, control apparatus 39 superposes the newly obtained three-dimensional information on the already accumulated three-dimensional information to create the 3D map, and the processing returns.

In the above configuration, laser scanner 17 may be combined with an infrared camera. In this case, heat source information can be detected by the infrared camera. Detection of an operator and another operation machine that are invisible by conveyance object W or an obstacle can achieve a safer crane operation. Furthermore, detection of an operator and another operation machine at the operation site can also be helpful for crime prevention at the operation site.

INDUSTRIAL APPLICABILITY

The present invention is applicable to a crane.

REFERENCE SIGNS LIST

1: Crane
8: Telescopic boom
17: Laser scanner
43: Swing operation detection sensor
44: Luffing operation detection sensor
45: Extending and retracting operation detection sensor
W: Conveyance object

The invention claimed is:

1. A crane, comprising:
a three-dimensional information obtaining section provided on a boom of the crane and configured to obtain point group data represented as three-dimensional coordinate values of an object as three-dimensional information by irradiating a monitoring area which is a part of a work area of the crane with laser light and calculating a measured distance to the object from a time period in which the laser light is reflected by the object and travels back; and
a control apparatus configured to sequentially accumulate the three-dimensional information obtained by the three-dimensional information obtaining section and create a 3D map of the work area based on the accumulated three-dimensional information, wherein
the monitoring area is composed of a measurement direction and a measurement range of the three-dimensional information obtaining section,
the three-dimensional information obtaining section is configured to be capable of accumulating the obtained three-dimensional information and changing the measurement direction, the measurement range and a measurement density,
the control apparatus is further configured to, while an operation signal of the crane is not detected, cause the three-dimensional information obtaining section to obtain the three-dimensional information under a first measurement condition, and, when the operation signal of the crane is detected, cause the three-dimensional information obtaining section to obtain the three-dimensional information under a second measurement condition in which the measurement density is higher than in the first measurement condition, and
the control apparatus is further configured to densify the accumulated three-dimensional information by superposing, on the three-dimensional information obtained while the operation signal of the crane is not detected, the three-dimensional information obtained when the operation signal of the crane is detected.

2. The crane according to claim 1, wherein the operation signal is an operation signal of a swing operation of a swivel base, a luffing operation of the boom or an extending and retracting operation, and
the control apparatus is configured to change the measurement direction based on a movement direction and a movement rate of the boom calculated from a detected value of the operation signal, and reduce the measurement range in comparison with the range in a case where the operation signal is not detected, and increases the measurement density.

3. The crane according to claim 2, wherein, when an operation amount of the swing operation, the luffing operation or the extending and retracting operation is changed, the control apparatus is configured to correct the measurement direction based on the operation amount.

4. The crane according to claim 1, wherein, when a delay in creation of the 3D map occurs, the control apparatus is configured to reduce the amount of obtained three-dimensional information per hour by changing at least one of the measurement range and the measurement density of the three-dimensional information obtaining section.

5. The crane according to claim 2, wherein, when a delay in creation of the 3D map occurs, the control apparatus is configured to reduce the amount of obtained three-dimensional information per hour by changing at least one of the measurement range and the measurement density of the three-dimensional information obtaining section.

6. The crane according to claim 3, wherein, when a delay in creation of the 3D map occurs, the control apparatus is configured to reduce the amount of obtained three-dimensional information per hour by changing at least one of the measurement range and the measurement density of the three-dimensional information obtaining section.

* * * * *